(12) United States Patent
Li et al.

(10) Patent No.: US 11,836,437 B2
(45) Date of Patent: Dec. 5, 2023

(54) CHARACTER DISPLAY METHOD AND APPARATUS, ELECTRONIC DEVICE, AND STORAGE MEDIUM

(71) Applicant: Lemon Inc., Grand Cayman (KY)

(72) Inventors: Yunzhu Li, Los Angeles, CA (US); Liyou Xu, Beijing (CN); Zhili Chen, Los Angeles, CA (US); Yiheng Zhu, Los Angeles, CA (US); Shihkuang Chu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/060,454

(22) Filed: Nov. 30, 2022

(65) Prior Publication Data
US 2023/0177253 A1    Jun. 8, 2023

Related U.S. Application Data

(63) Continuation of application No. PCT/SG2021/050491, filed on Aug. 23, 2021.

(30) Foreign Application Priority Data

Sep. 10, 2020    (CN) .......................... 202010948338.5

(51) Int. Cl.
  *G06T 7/70*    (2017.01)
  *G06T 19/00*   (2011.01)
  *G06F 40/109*  (2020.01)
(52) U.S. Cl.
  CPC .......... *G06F 40/109* (2020.01); *G06T 19/006* (2013.01)
(58) Field of Classification Search
  None
  See application file for complete search history.

(56) References Cited

U.S. PATENT DOCUMENTS 10,914,957 B1 *   2/2021  Stahl .................... H04N 19/527
2015/0363001 A1 * 12/2015  Malzbender ....... G06V 10/7715
                                                706/18
(Continued)

FOREIGN PATENT DOCUMENTS

CN          101075349 A      11/2007
CN          103729878 A       4/2014
(Continued)

OTHER PUBLICATIONS

Sarah Dawood, "Weird Type AR app lets you draw with words in mid-air", Mar. 16, 2018, URL: https://www.designweek.co.uk/issues/12-18-march-2018/weird-type-ar-app-lets-draw-words-mid-air/ (Year: 2018).*

(Continued)

*Primary Examiner* — David H Chu
(74) *Attorney, Agent, or Firm* — ARENTFOX SCHIFF LLP (57) ABSTRACT

A text display method, a text display apparatus, an electronic device and a storage medium are disclosed. A real scene image and a to-be-displayed text are acquired, motion track data for texts is invoked, the to-be-displayed text is processed with a dynamic special effect, and the text which has been subject to the dynamic special effect processing is displayed on a real scene image, thus realizing a function of displaying a text with dynamic special effect in augmented reality display, making the text display effect more vivid. The display method can be widely used in various application scenarios to bring users a better visual and sensory experience.

16 Claims, 5 Drawing Sheets

(56) References Cited

U.S. PATENT DOCUMENTS

| | | | |
|---|---|---|---|
| 2017/0032575 A1* | 2/2017 | Yeoh | G06T 7/20 |
| 2017/0301141 A1 | 10/2017 | Wang et al. | |
| 2018/0113717 A1* | 4/2018 | Lu | G06F 9/451 |
| 2019/0180483 A1* | 6/2019 | DeLuca | G02B 27/017 |
| 2020/0272658 A1* | 8/2020 | Suyash | G06N 20/00 |

FOREIGN PATENT DOCUMENTS

| | | |
|---|---|---|
| CN | 105184840 A | 12/2015 |
| CN | 106100983 A | 11/2016 |
| CN | 107590860 A | 1/2018 |
| CN | 107710284 A | 2/2018 |
| CN | 108022306 A | 5/2018 |
| CN | 108337547 A | 7/2018 |
| CN | 109035421 A | 12/2018 |
| CN | 110738737 A | 1/2020 |
| CN | 110874859 A | 3/2020 |
| CN | 111274910 A | 6/2020 |
| CN | 111415422 A | 7/2020 |
| CN | 111476911 A | 7/2020 |
| CN | 111640193 A | 9/2020 |
| WO | 2020038378 A1 | 2/2020 |

OTHER PUBLICATIONS

Jimmy Gunawan, "AR VLOG / Weird Type App", Mar. 13, 2018, URL: https://www.youtube.com/watch?v=97yAmY0q_bs&t=24s (Year: 2018).*

Zach Lieberman, "weird type examples", Mar. 25, 2018, URL: weird type examples (Year: 2018).*

Some thoughts on SLAM+AR technology and application. https://blog.csdn.net/yunqishequ1/article/details/78392480.

International Search Report and Written Opinion issued Nov. 26, 2021 in connection with International application No. PCT/SG2021/050491.

* cited by examiner

CHARACTER DISPLAY METHOD AND APPARATUS, ELECTRONIC DEVICE, AND STORAGE MEDIUM

This application is a continuation of International Patent Application No. PCT/SG2021/050491, filed on Aug. 23, 2021, which claims priority of Chinese Patent Application No. 202010948338.5, filed on Sep. 10, 2020. All the aforementioned patent applications are hereby incorporated by reference in their entireties.

TECHNICAL FIELD

Embodiments of the present disclosure relate to a text display method and a text display apparatus, an electronic device, and a storage medium.

BACKGROUND

Augmented Reality (AR) display technology is a technology that subtlety integrates virtual information with the real world. By integrating more special effects into virtual augmented reality display technology, it can present a better application scenario.

The application of texts in virtual augmented reality display is an important part of virtual augmented reality display technology. In existing text display solutions, static text display is generally adopted, which makes the text display effect more rigid and the display pattern more monotonous.

SUMMARY

To solve the above problems, the embodiments of the present disclosure provide a method and a text display apparatus, an electronic device, and a storage medium.

In a first aspect, an embodiment of the present disclosure provides a text display method, which includes: acquiring a real scene image; acquiring a to-be-displayed text; invoking motion track data for texts to perform dynamic special effect processing on the to-be-displayed text; displaying, on the real scene image, the text which has been subject to the dynamic special effect processing.

In a second aspect, an embodiment of the present disclosure provides a text display apparatus, which includes: a communication module configured to acquire a real scene image and a to-be-displayed text; a processing module configured to invoke motion track data for texts to perform dynamic special effect processing on the to-be-displayed text; and a display module configured to display, on the real scene image, the text which has been subject to the dynamic special effect processing.

In a third aspect, an embodiment of the present disclosure provides an electronic device, which includes: at least one processor; and a memory; the memory stores computer execution instructions; the at least one processor executes the computer execution instructions stored in the memory, to cause the at least one processor executes the first aspect above and various possible text display methods as described in the first aspect.

In a fourth aspect, an embodiment of the present disclosure provides a computer readable storage medium, computer execution instruction is stored in the computer readable storage medium, and in a case where the processor executes the computer execution instructions, the first aspect above and various possible text display methods as described in the first aspect are implemented.

In the text display method, the text display apparatus, the electronic device, and the storage medium provided by the embodiments of the present disclosure, a real scene image and a to-be-displayed text are acquired, motion track data for texts is invoked, the to-be-displayed text is processed with a dynamic special effect, and the text which has been subject to the dynamic special effect processing is displayed on a real scene image, thus realizing a function of displaying a text with dynamic special effect in augmented reality display, making the text display effect more vivid. The display method can be widely used in various application scenarios to bring users a better visual and sensory experience. realizes the function of dynamic special effect display of text in virtual augmented reality display by acquiring a real scene image, invoking the motion track data for texts, and performing dynamic special effect processing on the to-be-displayed text, thus making the text display effect more vivid. The display method can be widely used in various application scenarios to bring users a better visual and sensory experience.

BRIEF DESCRIPTION OF THE DRAWINGS

In order to illustrate the technical solutions of the embodiments of the present disclosure or of the related art more clearly, the following briefly introduces the accompanying drawings used in the description of the embodiments. Apparently, the accompanying drawings in the following description are only some embodiments of the present disclosure. For those of ordinary skill in the art, other drawings can also be obtained based on these drawings without creative work.

FIG. 1 is a schematic diagram of a network architecture which the present disclosure is based on;

FIG. 2 is a schematic diagram of a first scenario which a text display method is based on;

FIG. 3 is a schematic diagram of another network architecture which the present disclosure is based on;

FIG. 4 is a schematic diagram of a second scenario which a text display method is based on;

DETAILED DESCRIPTION

In order to make objectives, technical solutions, and advantages of the embodiments of the present disclosure more clear, technical solutions in the embodiments of the present disclosure will be described clearly and completely below with reference to the drawings for the embodiments of the present disclosure. Apparently, the embodiments described are only a part of the embodiments of the present disclosure, not all of them. Based on the embodiments in the present disclosure, all other embodiments obtained by those ordinarily skilled in the art without doing creative work fall within the scope of the present disclosure.

Augmented Reality (AR) display technology is a technology that subtlety integrates virtual information with the real world. By integrating more special effects into virtual Augmented Reality display technology, it can present a better application scenario.

The application of text in virtual augmented reality display is an important part of virtual augmented reality display technology. In existing text display solutions, static text display is generally adopted, which makes the text display effect more rigid and the display pattern more monotonous.

To solve such problem, embodiments of the present disclosure provide a text display method. Motion track data for texts is invoked, a to-be-displayed text is processed with a dynamic special effect, and the text which has been subject to the dynamic special effect processing is displayed based on augmented reality technology on a real scene image obtained by photographing, thus realizing a function of displaying a text with dynamic special effect in augmented reality display, making the text display effect more vivid. The display method can be widely used in various application scenarios to bring users a better visual and sensory experience.

Figure 1:
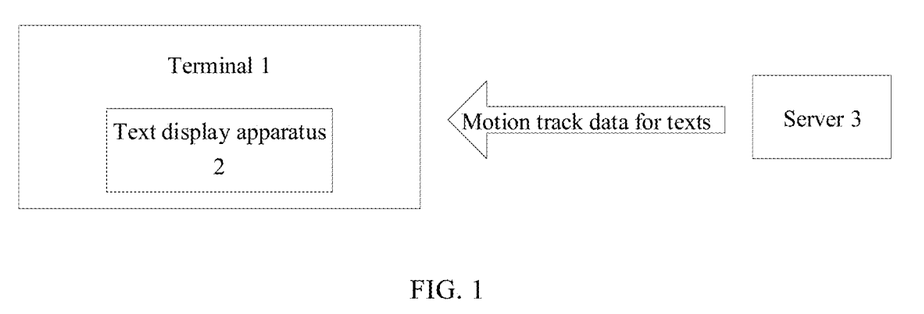

Referring to FIG. 1, FIG. 1 is a schematic diagram of a network architecture which the present disclosure is based on. The network architecture shown in FIG. 1 can specifically include a terminal 1, a text display apparatus 2, and a server 3.

Here, the terminal 1 can specifically be a mobile phone of a user, a smart home device, a tablet computer and other hardware devices that can be used to capture a real scene and present the captured real scene. The text display apparatus 2 can be a client or display terminal integrated or installed on the terminal 1. The server 3 can be a server cluster storing various motion track data for texts, which is provided on a cloud.

The text display apparatus 2 can run on the terminal 1 and provide the terminal 1 with a display page for the terminal 1 to display on a screen or a display component thereof the page provided by the text display apparatus 2 to the user.

In addition, the text display apparatus 2 can also interact with the server 3 through a network component of the terminal 1, to obtain the previously stored motion track data for texts in the server 3.

In addition, in some optional implementations, the terminal 1 can also cache various motion track data for texts in the server 3 for ease of use. For example, the terminal 1 can store various motion track data for texts, and by invoking the motion track data for texts, a to-be-displayed text is processed with a dynamic special effect, and the text which has been subject to the dynamic special effect processing is displayed on a real scene image captured by the terminal 1.

Figure 2:
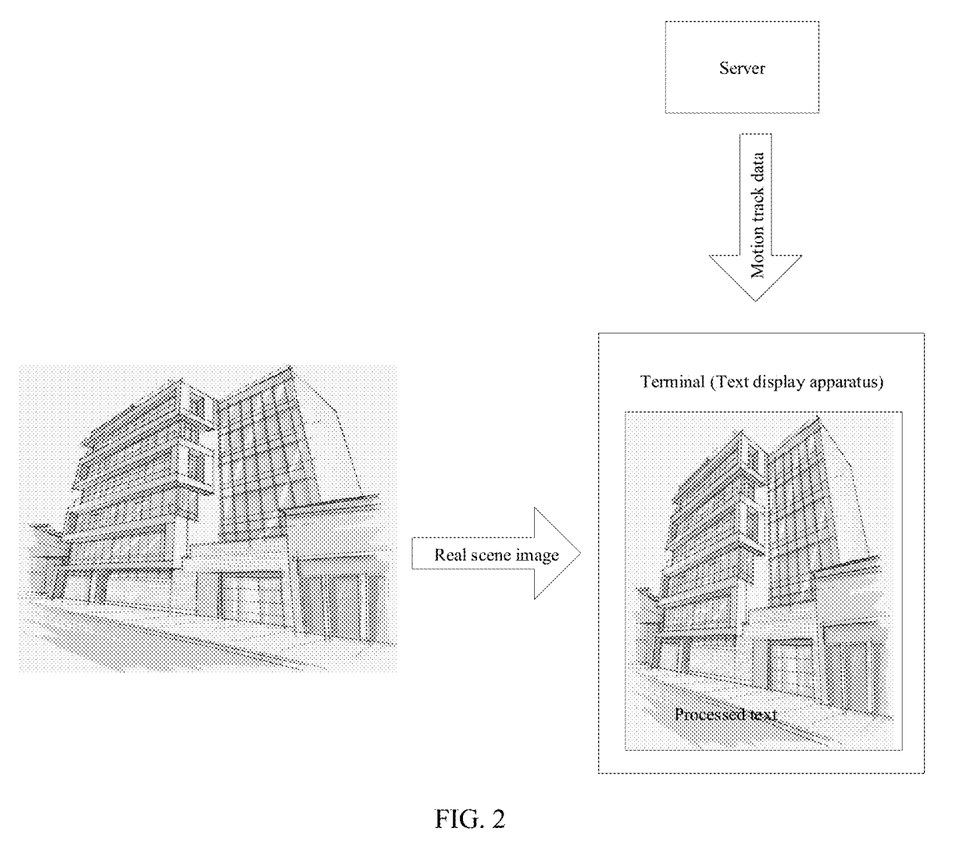

In particular, the architecture shown in FIG. 1 can be applied to a variety of application scenarios, and FIG. 2 is a schematic diagram of a first scenario which a text display method is based on.

As shown in FIG. 2, in this scenario, a user can start a virtual augmented reality display function provided by the text display apparatus, and send an operation instruction for displaying a to-be-displayed text, to the text display apparatus 2 through the terminal 1, so that the text display apparatus 2 can interact with the server 3 to obtain corresponding motion track data for texts. The text display apparatus 2 processes the to-be-displayed text with the motion track data for texts, and displays the processed text in a real scene image captured by the terminal.

In this scenario, the user can record screen of the processed real scene image to obtain image works of a personal style, and can also use the processed real scene image as a pictorial presentation of a navigation scene displayed with virtual augmented reality, a pictorial presentation of a travel scene displayed with virtual augmented reality, and so on.

Figure 3:
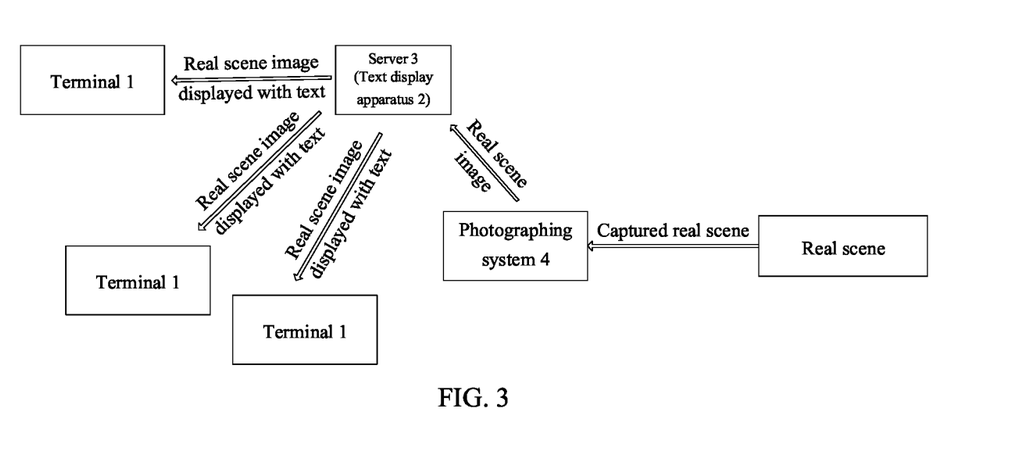

In addition, referring to FIG. 3, FIG. 3 is a schematic diagram of another network architecture which the present disclosure is based on. The network architecture shown in FIG. 3 can specifically include a plurality of terminals 1, a text display apparatus 2, a server 3, and a photographing system 4.

Different from the architecture shown in FIG. 1, the text display apparatus 2 is integrated in the server 3. In the network architecture shown in FIG. 3, the photographing system 4 can interact with the server 3 to provide a real scene image for the text display apparatus 2 therein. The text display apparatus 2 will process the real scene image with the text display method provided by the present disclosure, and send the processed image to a plurality of terminals 1 for viewing and retrieving.

Here, the photographing system 4 can be composed of a plurality of photographing devices provided in a same photographing area, and the plurality of photographing devices will photograph the photographing area at different photographing angles. When the photographing system 4 is photographing the photographing area, the captured real scene image will be transmitted to the server 3, and forwarded to the text display apparatus 2 through the server 3, to be presented on the terminal 1.

In particular, the architecture shown in FIG. 3 can be applied to a text display scenario based on a live video. In this regard, FIG. 4 is a schematic diagram of a second scenario which a text display method is based on.

Figure 4:
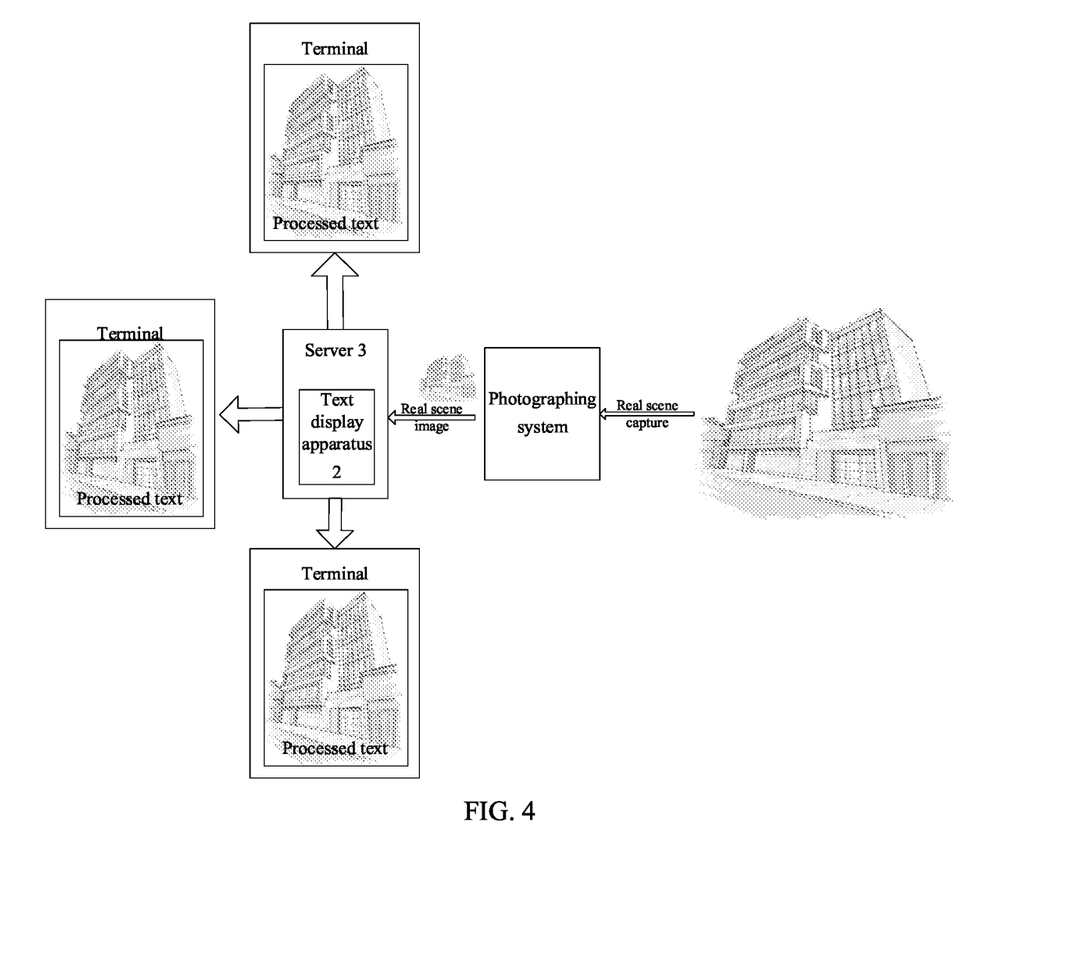

As shown in FIG. 4, in this scenario, a multi-angle real scene image captured by a photographing system will be processed by the text display apparatus in the server and sent to the terminals 1 in different locations for viewing by the users.

The structure shown in FIG. 1 will be taken as an example to further explain the text display method provided by the present disclosure. Here, the application of the text display method in the structure shown in FIG. 3 is similar to the structure shown in FIG. 1, which will not be repeated.

Figure 5:
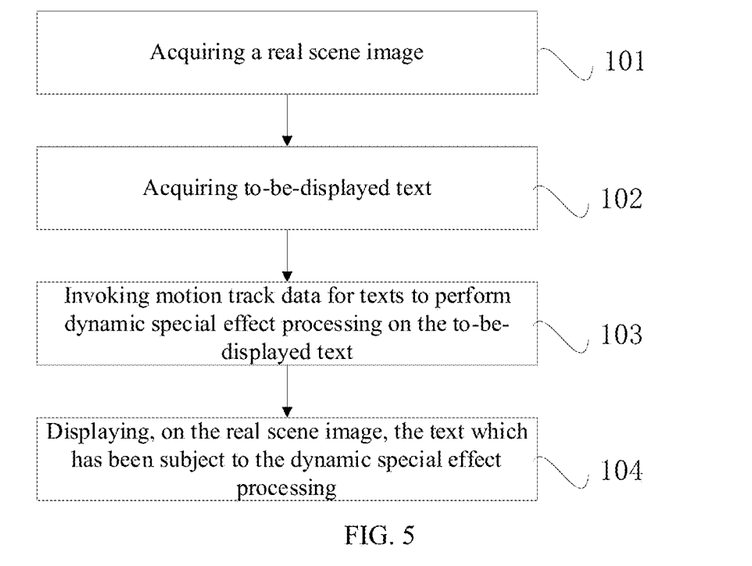
FIG. 5 is a flowchart of a text display method provided by embodiments of the present disclosure.

In a first aspect, referring to FIG. 5, FIG. 5 is a flowchart of a text display method provided by embodiments of the present disclosure. The text display method provided by the embodiments of the present disclosure includes the following steps.

step 101, acquiring a real scene image.

step 102, acquiring a to-be-displayed text.

In the present disclosure, the to-be-displayed text can be acquired in a variety of approaches.

In one optional implementation, the to-be-displayed text is directly acquired by receiving text information input by the user.

In another optional implementation, the display apparatus can acquire a voice input by the user, perform voice conversion on the voice, to obtain the to-be-displayed text.

In yet another optional implementation, body information input by the user can also be acquired, according to a mapping relationship between preset body information and texts, a text corresponding to the body information can be determined, and the text corresponding to the body information is taken as the to-be-displayed text. The body information includes one or more of sign language information, gesture information and facial expression information.

step 103, invoking motion track data for texts to perform dynamic special effect processing on the to-be-displayed text.

step 104, displaying, on the real scene image, the text which has been subject to the dynamic special effect processing.

It should be noted that the entity performing the processing method provided in this example is the text display apparatus described above. As shown above, the text display apparatus can be installed in a terminal or a server. No matter what device the text display apparatus is installed in, the text display apparatus can receive an operation triggered by the user through the device (the terminal or the server) the text display apparatus is installed in, and perform corresponding processing to send the processing result to the terminal and display the same.

Different from existing technologies, the solution based on the present disclosure includes the steps of invoking motion track data for texts, performing dynamic special effect processing on a to-be-displayed text, and displaying, on the real scene image, the text which has been subject to the dynamic special effect processing.

With the solution of the present disclosure, the function of displaying a text with dynamic special effect in augmented reality display can be realized, making the text display effect more vivid. The display method can be widely used in various application scenarios to bring users a better visual and sensory experience.

Figure 6:
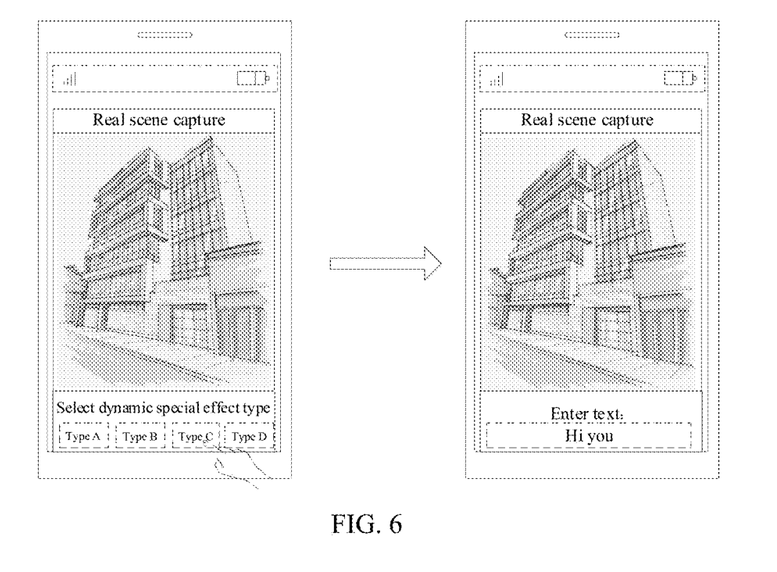
FIG. 6 is a schematic diagram of a first interface in a text display method provided by the present disclosure.
Figure 7:
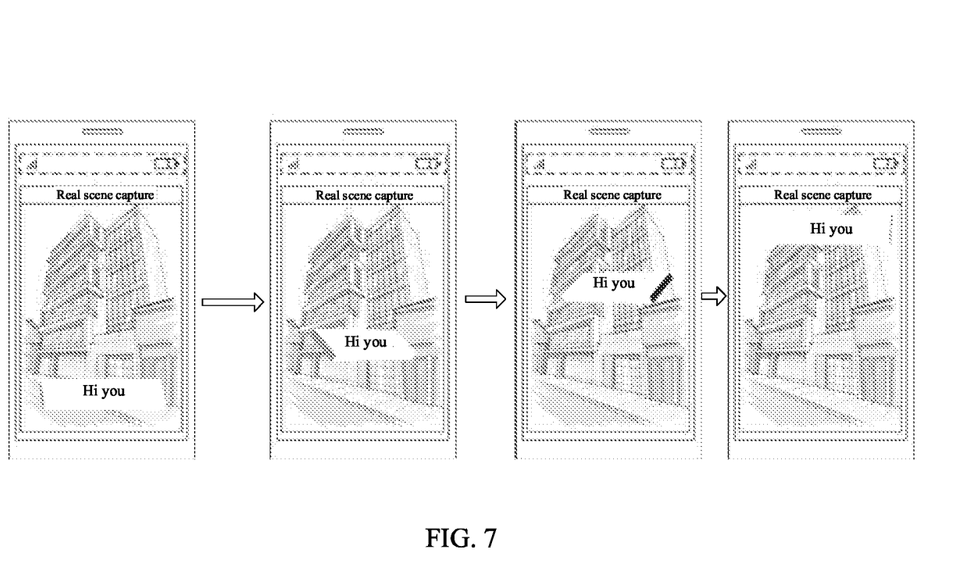
FIG. 7 is a schematic diagram of a second interface in a text display method provided by the present disclosure.

FIG. 6 is a schematic diagram of a first interface in a text display method provided by the present disclosure, and FIG. 7 is a schematic diagram of a second interface in a text display method provided by the present disclosure. As shown in FIG. 6, first, when the user triggers the text display apparatus to perform the display function, the text display apparatus will first acquire a real scene image by interacting with a photographing component of the terminal or through the photographing system. Then the display apparatus will acquire a to-be-displayed text, invoke motion track data for texts, and perform dynamic special effect processing on the to-be-displayed text. As shown in FIG. 7, the display apparatus will display on the real scene image the text which has been subject to the dynamic special effect processing.

In an optional implementation, step 103 can be implemented as follows.

In step 1031, an instruction for selecting a dynamic special effect type is received from the user.

In step 1032, the text display apparatus can invoke a corresponding type of motion track data for texts from a text motion track database according to the selected dynamic special effect type.

Here, the dynamic special effect type specifically refers to a text effect provided by the text display apparatus which can be selected by the user. For different dynamic special effect types, different dynamic special effects will be performed on the text to make it present different dynamic motion tracks and different rendering results. The motion track data for texts corresponding to different dynamic special effect types are designed by developers in advance and stored in the text motion track database of the server, for the text display apparatus to invoke at any time.

In step 1033, a three-dimensional text modeling of the to-be-displayed text is generated according to the selected dynamic special effect type, to obtain modeling data of the text.

In step 1034, the modeling data of the text is processed with the motion track data for texts obtained above to obtain the text which has been subject to the dynamic special effect processing.

Furthermore, according to the selected dynamic special effect type, the three-dimensional text modeling of the to-be-displayed text is generated, to obtain modeling data of the text. Here, the modeling data of the text can be specifically composed of three-dimensional text coordinates of the text. Taking FIG. 7 as an example, if the text is "Hi, you", modeling is performed on "you" and "Hi" respectively, to obtain corresponding three-dimensional text models "you" and "Hi" respectively. Then, the central coordinates of the two three-dimensional text models will be used as the three-dimensional text coordinates of the text.

Motion track data for texts includes coordinates of text positions in different motion frames. For example, for a certain type of dynamic special effect, for example, the motion track of the text is "sliding" from a left side of an interface to a right side of the interface, and the "sliding" duration is 1 second (corresponding to N motion frames), so it can be seen that the motion track data for texts includes coordinates of the text position in each motion frame:

For example, the coordinates of the text position in a first motion frame are [(x11, y11, z11), (x12, y12, z12)], where (x11, y11, z11) is used to represent coordinates of the text position of "you" in the first motion frame, and (x12, y12, z12) is used to represent coordinates of the text position of "Hi" in the first motion frame.

In the Nth motion frame, the coordinates of the text position will be [(xN1, yN1, z21), (xN2, yN2, zN2)]; where (xN1, yN1, zN1) is used to represent coordinates of the text position of "you" in the Nth motion frame, and (xN2, yN2, zN2) is used to represent coordinates of the text position of "Hi" in the Nth motion frame.

That is, for "you", the set of coordinates of text positions in the N motion frames, such as (x11, y11, z11), (x21, y21, z21) ... (xN1, yN1, z21), will become a motion track thereof in a corresponding duration of the N motion frames. Similarly, for "Hi", the set of coordinates of text positions in the N motion frames, such as (x12, y12, z12), (x22, y22, z22) ... (xN2, yN2, zN2), will become motion track thereof in a corresponding duration of the N motion frames.

However, coordinates of text positions are used to represent coordinates of respective text positions. In other words, when the same dynamic special effect type is used, coordinates of the text positions in the motion track data for texts having different number of characters are also different. Correspondingly, if the number of characters changes, the display apparatus needs to re-determine coordinates of text position for each character in each motion frame to ensure that each character in the text can be accurately represented.

In step 1034, the modeling data of the text is processed with the motion track data for texts obtained above to obtain the text which has been subject to the dynamic special effect processing.

Specifically, in this step, the display apparatus will map the three-dimensional text coordinates of the text to a coordinate system on which the motion track data for texts is based using a preset coordinate mapping script, so as to ensure that the coordinates are under the same coordinate system.

Then, the display apparatus performs coordinate aligning processing on the mapped three-dimensional text coordinates of the text with the coordinates of the text position in each motion frame in the motion track data for texts, that is, to align the three-dimensional text coordinates of the center point of each text in the text to the text position coordinates corresponding to the text. Finally, the text which has been subject to the coordinate aligning processing is taken as the text which has been subject to the dynamic special effect processing.

Optionally, in the solution provided by the present disclosure, the dynamic special effect processing for the text also includes: performing special effect processing on a text shape of the text. Based on the different types of dynamic special effects selected by the user, the display apparatus will use different special effect processing algorithms to process the text shape of the text. For example, based on the three-dimensional models of "you" and "Hi", special effects can also be performed on the three-dimensional models, such as artistic word processing to make the three-dimensional models of the text have a certain artistic style.

In an optional implementation, after obtaining the text which has been subject to the dynamic special effect processing, a step of displaying, on the real scene image, the text which has been subject to the dynamic special effect processing will also be included. Specifically, this step can be implemented with a virtual reality enhancement algorithm, such as the SLAM fusion algorithm, that is, performing a fuse processing on the text which has been subject to the dynamic special effect processing with the real scene image, and displaying the real scene image which has been subject to the fusion processing. Here, the SLAM fusion algorithm is a known algorithm model for fusing virtual information and real scene images for display. With this fusion algorithm and from the three-dimensional text coordinates of the aligned text in each moving frame, the function of fusing text into the real scene image and displaying the same can be realized.

Optionally, the display method also includes the function of selecting a special effect display area. Specifically, displaying, on the real scene image, the text which has been subject to the dynamic special effect processing also includes: determining a special effect display area in the real scene image according to the selected dynamic special effect type; and displaying on the special effect display area of the real scene image the text which has been subject to the dynamic special effect processing.

Further, in the process of determining the special effect display area, a target recognition processing can be performed on the real scene image according to the selected dynamic special effect type to determine a target area of the real scene image; and the special effect display area is determined according to the target area of the real scene image.

Figure 8:
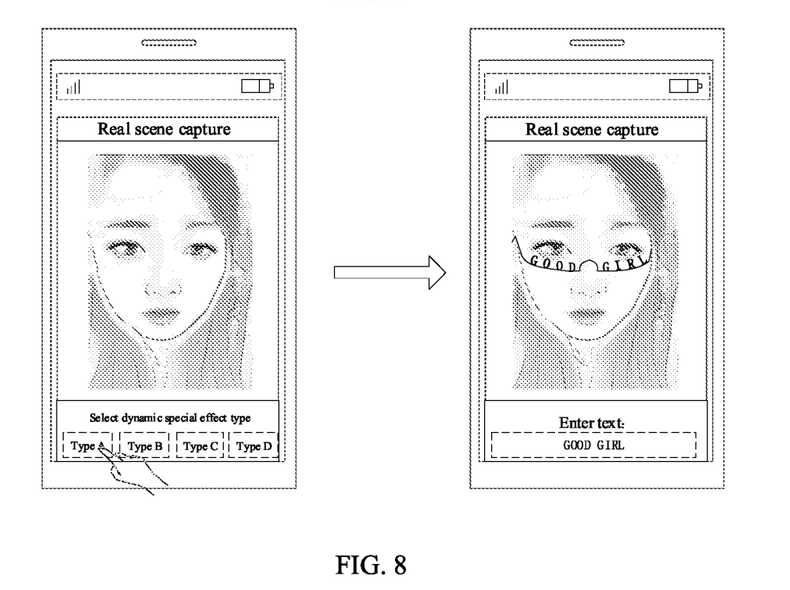
FIG. 8 is a schematic diagram of a third interface in a text display method provided by the present disclosure.

Taking a scenario based on face self portrait as an example, FIG. 8 is a schematic diagram of third interface in a text display method provided by the present disclosure. As shown in FIG. 8, in this scenario, the display apparatus can obtain a real scene image including a face by turning on a front camera of the terminal, and then one of the dynamic special effects is selected from a variety of dynamic special effect types provided on the interface, so that the corresponding text is displayed in the special effect display area of the face in the real scene image.

Specifically, in the third interface in FIG. 8, a variety of dynamic special effect types are provided: type A, type B, type C, and type D. When receiving an instruction of selecting the special effect type of "Type A (for example, this type A is a special effect of glasses for texts)" from the user, based on this type, a special effect display area that generates this text in the real scene image is first determined, such as an area where the eyes on the face are located in the real scene image. Then, the motion track data for texts corresponding to the special effect type is invoked, and dynamic special effect processing is performed on the text (such as "GOOD GIRL" entered by the user). Finally, the processed text is displayed in the previously obtained special effect display area (such as the area where the eyes are located). In one embodiment, related virtual objects can also be added in the special effect display area, and the processed text can be displayed at the position of the virtual object. For example, in FIG. 8, virtual glasses can be provided in the eye area first, and the processed text can be displayed on the virtual glasses to enhance the aesthetics of the interface.

Figure 9:
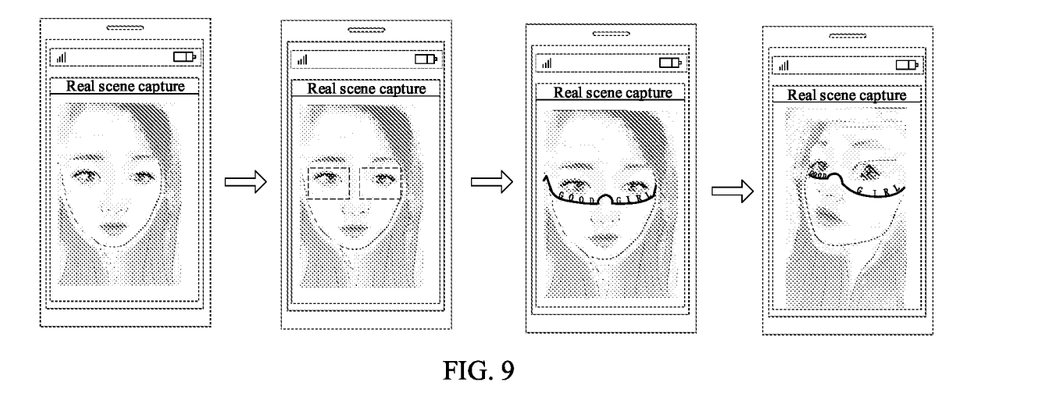
FIG. 9 is a schematic diagram of a fourth interface in a text display method provided by the present disclosure.

FIG. 9 is a schematic diagram of a fourth interface in a text display method provided by the present disclosure. As shown in FIG. 9, the display apparatus will recognize the face in the current real scene image based on the dynamic special effect type to determine the position area of the eyes in the face in the image, and then determine the special effect display area according to the area where the eyes are located. Correspondingly, when the face turns around or changes the position in the image, the special effect display area will also be changed accordingly to obtain the schematic diagram shown in FIG. 9. For example, the position and angle of the processed text can also change correspondingly in the screen with the change of the position and angle of the face.

In addition, in the present disclosure, the text display apparatus can acquire the to-be-displayed text in a variety of ways.

In the present disclosure, the to-be-displayed text can be acquired in a variety of approaches.

In one optional implementation, the to-be-displayed text is directly acquired by receiving text information input by the user.

In another optional implementation, the display apparatus can acquire a voice input by the user, perform voice conversion on the voice, to obtain the to-be-displayed text.

In yet another optional implementation, the display apparatus can also acquire body information input by the user, according to a mapping relationship between preset body information and texts, determine a text corresponding to the body information, and take the text corresponding to the body information as the to-be-displayed text. The body information includes one or more of sign language information, gesture information and facial expression information.

In the text display method provided by the embodiments of the present disclosure, a real scene image is acquired, motion track data for texts is invoked, a to-be-displayed text is processed with a dynamic special effect, and the text which has been subject to the dynamic special effect processing is displayed on a real scene image, thus realizing a function of displaying a text with dynamic special effect in augmented reality display, making the text display effect more vivid. The display method can be widely used in various application scenarios to bring users a better visual and sensory experience. realizes the function of dynamic special effect display of text in virtual augmented reality display by acquiring a real scene image, invoking the motion track data for texts, and performing dynamic special effect processing on the to-be-displayed text, thus making the text display effect more vivid. The display method can be widely used in various application scenarios to bring users a better visual and sensory experience.

Figure 10:
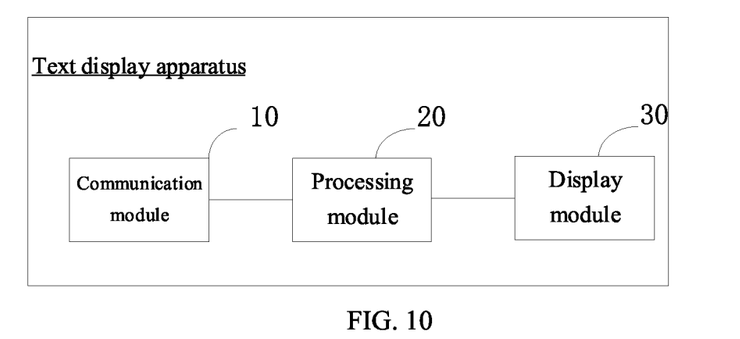
FIG. 10 is a structural block diagram of a text display apparatus provided by embodiments of the present disclosure.

Corresponding to the text display method in the above embodiments, FIG. 10 is a structural block diagram of a text display apparatus provided by embodiments of the present disclosure. For the convenience of description, only those parts related to embodiments of the present disclosure are shown. Referring to FIG. 10, the text display apparatus includes a communication module 10, a processing module 20 and a display module 30.

The communication module 10 is configured to acquire a real scene image and a to-be-displayed text.

The processing module 20 is configured to invoke motion track data for texts to perform dynamic special effect processing on the to-be-displayed text.

The display module 30 is configured to display, on the real scene image, the text which has been subject to the dynamic special effect processing.

In an optional implementation, the communication module 10 is configured to receive an instruction for selecting a dynamic special effect type from a user.

The processing module 20 is also configured to determine a special effect display area in the real scene image according to the selected dynamic special effect type.

The display module 30 is configured to display, on the special effect display area of the real scene image, the text which has been subject to the dynamic special effect processing.

In an optional implementation, the processing module 20 is also configured to perform target recognition processing on the real scene image according to the selected dynamic special effect type, determine in the real scene image an image area where the to-be-recognized target is located; and determine the special effect display area according to the image area where the to-be-recognized target is located.

In an optional implementation, the communication module 10 is configured to receive an instruction for selecting a dynamic special effect type from the user.

The processing module 20 is specifically configured to invoke a corresponding type of motion track data for texts from a text motion track database according to the selected dynamic special effect type; generate a three-dimensional text modeling of the to-be-displayed text according to the selected dynamic special effect type, to obtain modeling data of the text; and process the modeling data of the text with the motion track data for texts to obtain the text which has been subject to the dynamic special effect processing.

In an optional implementation, the modeling data of the text includes three-dimensional text coordinates of the text. The motion track data for texts includes coordinates of text positions in different motion frames.

The processing module 20 is specifically configured to map the three-dimensional text coordinates of the text to a coordinate system on which the motion track data for texts is based using a preset coordinate mapping script; and perform coordinate aligning processing on the mapped three-dimensional text coordinates of the text with the coordinates of the text position in each motion frame in the motion track data for texts; and take the text which has been subject to the coordinate aligning processing as the text which has been subject to the dynamic special effect processing.

In an optional implementation, the processing module 20 is also configured to perform special effect processing on a text shape of the text.

In an optional implementation, the display module 30 is specifically configured to, based on augmented reality display technology, perform a fuse processing on the text which has been subject to the dynamic special effect processing with the real scene image, and display the real scene image which has been subject to the fusion processing.

In an optional implementation, the communication module 10 is also configured to acquire a voice input by the user, perform voice conversion on the voice, to obtain the to-be-displayed text.

In an optional implementation, the communication module 10 is also configured to acquire body information input by the user, according to a mapping relationship between preset body information and texts, determine a text corresponding to the body information, and take the text corresponding to the body information as the to-be-displayed text.

In an optional implementation, the body information includes one or more of sign language information, gesture information and facial expression information.

In the text display apparatus provided by the embodiments of the present disclosure, a real scene image and a to-be-displayed text are acquired, motion track data for texts is invoked, a to-be-displayed text is processed with a dynamic special effect, and the text which has been subject to the dynamic special effect processing is displayed on a real scene image, thus realizing a function of displaying a text with dynamic special effect in augmented reality display, making the text display effect more vivid. The display method can be widely used in various application scenarios to bring users a better visual and sensory experience. realizes the function of dynamic special effect display of text in virtual augmented reality display by acquiring a real scene image, invoking the motion track data for texts, and performing dynamic special effect processing on the to-be-displayed text, thus making the text display effect more vivid. The display method can be widely used in various application scenarios to bring users a better visual and sensory experience.

An electronic device provided in the embodiment can be configured to implement the technical solution of the above method embodiment. The implementation principle and technical effect are similar, which will not be repeated here in this embodiment.

Figure 11:
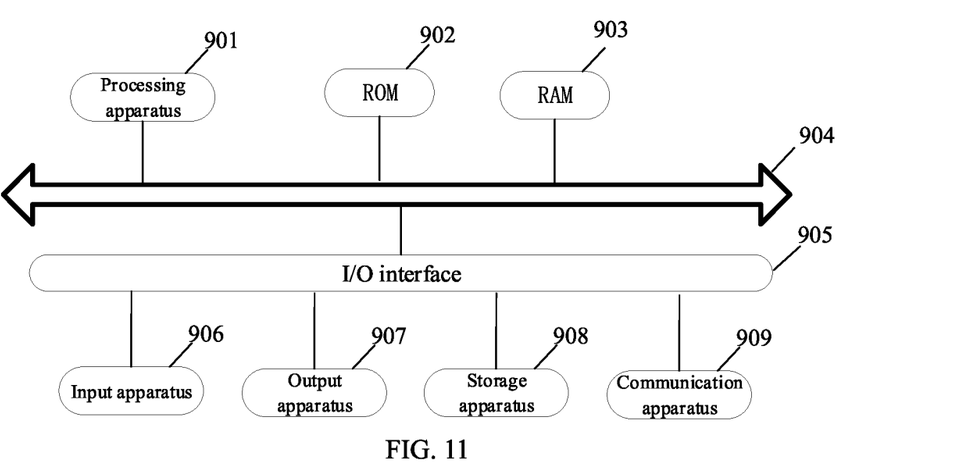
FIG. 11 is a schematic diagram of a hardware structure of an electronic device provided by embodiments of the present disclosure.

Referring to FIG. 11, FIG. 11 is a schematic diagram of a hardware structure of an electronic device 900 provided by embodiments of the present disclosure. The electronic device 900 can be a terminal device or a media library. Here, the terminal device can include but is not limited to a mobile terminal such as a mobile phone, a laptop, a digital radio receiver, a Personal Digital Assistant (PDA), a Portable Android Device (PAD), a Portable Media Player (PMP), a vehicle terminal (such as a vehicle navigation terminal), and a Digital TV Fixed terminal of a desktop computer, etc. The electronic device shown in FIG. 11 is only an example, and there should be no restrictions on the function and the application scope of the embodiments of the present disclosure.

As shown in FIG. 11, the electronic device 900 can include a text display apparatus (such as a central processing unit, a graphics processor, etc.) 901, which can perform various appropriate actions and processes according to a program stored in a read only memory (ROM) 902 or a program loaded from a storage apparatus 908 into a random access memory (RAM) 903. In the RAM 903, various programs and data required for the operation of electronic device 900 are also stored. The text display apparatus 901, the ROM 902 and the RAM 903 are connected to each other via a bus 904. The input/output (I/O) interface 905 is also connected to the bus 904.

Generally, the following apparatuses can be connected to the I/O interface 905: an input apparatus 906 including, for example, a touch screen, a touch pad, a keyboard, a mouse, a camera, a microphone, an accelerometer, a gyroscope, and the like; an output apparatus 907 including, for example, a screen, a loudspeaker, a vibrator, and the like; a storage apparatus 908 including, for example, a tape, a hard disk, and the like; and a communication apparatus 909. The communication apparatus 909 can allow the electronic device 900 to communicate with other devices through wired or wireless communication to exchange data. Although FIG. 11 shows an electronic device 900 having various apparatuses, it should be understood that it is not required to implement or have all the apparatuses shown. More or fewer apparatuses can alternatively be implemented or provided.

In particular, according to the embodiments of the present disclosure, the process described above with reference to the flowchart can be implemented as a computer software program. For example, an embodiment of the present disclosure includes a computer program product, which includes a computer program loaded on a computer-readable medium, and the computer program includes program code for executing the method shown in the flowchart. In such an embodiment, the computer program can be downloaded and installed from the network through the communication apparatus 909, or installed from the storage apparatus 908, or installed from the ROM 902. When the computer program is executed by the text display apparatus 901, the above functions defined in the method of the embodiments of the present disclosure are executed.

It should be noted that the computer-readable medium described in the present disclosure can be a computer-readable signal medium, a computer-readable storage medium, or any combination of the two. The computer-readable storage medium can be, for example, but not limited to, an electrical, magnetic, optical, electromagnetic, infrared, or semiconductor system, apparatus, or device, or any combination thereof. More specific examples of the computer-readable storage medium can include, but is not limited to: an electrical connection based on one or more wires, a portable computer disk, a hard disk, a random access memory (RAM), a read-only memories (ROM), an erasable programmable read-only memory (EPROM or a flash memory), an optical fiber, a portable compact disk read-only memory (CD-ROM), an optical storage device, a magnetic storage device or any suitable combination of the above. In the present disclosure, the computer-readable storage medium can be any tangible medium containing or storing a program, which can be used by or in combination with an instruction execution system, apparatus, or device. In the present disclosure, the computer-readable signal medium can include data signals transmitted in a baseband or as part of a carrier, in which computer-readable program code is carried. Such transmitted data signals can take various forms, including but not limited to electromagnetic signals, optical signals or any suitable combination of the above. The computer-readable signal medium can also be any computer-readable medium other than a computer-readable storage medium, which can transmit, propagate, or transmit programs for use by or in combination with an instruction execution system, apparatus, or device. The program code contained on the computer readable medium can be transmitted with any appropriate medium, including but not limited to: wire, optical cable, RF (radio frequency), etc., or any appropriate combination of the above.

The computer-readable medium can be included in the electronic device; or can also exist independently without being assembled into the electronic device.

The computer-readable medium carries one or more programs. When the one or more programs are executed by the electronic device, the electronic device can execute the method shown in the above embodiments.

Computer program code for performing the operations of the present disclosure can be written in one or more programming languages or a combination thereof. The programming languages include object-oriented programming languages such as Java, Smalltalk, C++, and conventional procedural programming languages such as "C" or similar programming languages. The program code can be executed completely on the user computer, partially on the user computer, as an independent software package, partially on the user computer, partially on the remote computer, or completely on the remote computer or media library. In the case involving a remote computer, the remote computer can be connected to the user computer through any kind of network, including a local area network (LAN for short) or a wide area network (WAN for short), or it can be connected to an external computer (for example, using an Internet service provider to connect over the Internet).

The flowcharts and block diagrams in the accompanying drawings illustrate the possible architectures, functions, and operations of the systems, the methods, and the computer program products according to various embodiments of the present disclosure. In this regard, each block in the flowchart or the block diagram can represent a module, a program segment, or a part of a code that contains one or more executable instructions for implementing a specified logical function. It should also be noted that in some alternative implementations, the functions marked in the block can also occur in a different order from those marked in the drawings. For example, two consecutive blocks can actually be executed basically in parallel, or they can sometimes be executed in a reverse order, depending on the function involved. It should also be noted that each block in the block diagram and/or the flowchart, and the combination of the blocks in the block diagram and/or the flowchart, can be implemented with a dedicated hardware based system that performs a specified function or operation, or can be implemented with a combination of dedicated hardware and computer instructions.

The units described in the embodiments of the present disclosure can be realized by software or hardware. Wherein, the name of the unit does not constitute the definition of the unit itself in some cases, for example, a first acquisition unit can also be described as "a unit that acquires at least two Internet protocol addresses".

The functions described above herein can be performed at least partially by one or more hardware logical units. For example, without limitation, exemplary types of hardware logic components that can be used include: a field programmable gate array (FPGA), an application specific integrated circuit (ASIC), an application specific standard product (ASSP), a system on chip (SOC), a complex programmable logic device (CPLD), and so on.

In the context of the present disclosure, a machine-readable medium can be a tangible medium, which can contain or store programs for use by or in combination with an instruction execution system, apparatus or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination thereof. More specific examples of the computer-readable storage medium can include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The following are some embodiments of the present disclosure.

In a first aspect, according to one or more embodiments of the present disclosure, a text display method includes:
acquiring a real scene image;
acquiring a to-be-displayed text;
invoking motion track data for texts to perform dynamic special effect processing on the to-be-displayed text;
displaying, on the real scene image, the text which has been subject to the dynamic special effect processing.

In an optional implementation, displaying, on the real scene image, the text which has been subject to the dynamic special effect processing includes:
receiving an instruction for selecting a dynamic special effect type from a user;
determining a special effect display area in the real scene image according to the selected dynamic special effect type;
displaying on the special effect display area of the real scene image the text which has been subject to the dynamic special effect processing.

In an optional implementation, determining a special effect display area in the real scene image according to the selected dynamic special effect type includes:
performing target recognition processing on the real scene image according to the selected dynamic special effect type, to determine in the real scene image an image area where the to-be-recognized target is located;
determining the special effect display area according to the image area where the to-be-recognized target is located.

In an optional implementation, invoking motion track data for texts to perform dynamic special effect processing on the to-be-displayed text includes:
receiving an instruction for selecting a dynamic special effect type from the user;
invoking a corresponding type of motion track data for texts from a text motion track database according to the selected dynamic special effect type; and
generating a three-dimensional text modeling of the to-be-displayed text according to the selected dynamic special effect type, to obtain modeling data of the text;
processing the modeling data of the text with the motion track data for texts to obtain the text which has been subject to the dynamic special effect processing.

In an optional implementation, the modeling data of the text includes three-dimensional text coordinates of the text.

The motion track data for texts includes coordinates of text positions in different motion frames.

Processing the modeling data of the text with the motion track data for texts to obtain the text which has been subject to the dynamic special effect processing includes:
mapping the three-dimensional text coordinates of the text to a coordinate system, on which the motion track data for texts is based, by using a preset coordinate mapping script;
performing coordinate aligning processing on the mapped three-dimensional text coordinates of the text with the coordinates of the text position in each motion frame in the motion track data for texts;
taking the text which has been subject to the coordinate aligning processing as the text which has been subject to the dynamic special effect processing.

In an optional implementation, the dynamic special effect processing also includes:
performing special effect processing on a text shape of the text.

In an optional implementation, displaying, on the real scene image, the text which has been subject to the dynamic special effect processing includes:
based on augmented reality display technology, performing a fuse processing on the text which has been subject to the dynamic special effect processing with the real scene image, and displaying the real scene image which has been subject to the fusion processing.

In an optional implementation, the method further includes:
acquiring a voice input by the user, performing voice conversion on the voice, to obtain the to-be-displayed text.

In an optional implementation, the method further includes:
acquiring body information input by the user, according to a mapping relationship between preset body information and texts, determining a text corresponding to the body information, and taking the text corresponding to the body information as the to-be-displayed text.

In an optional implementation, the body information includes one or more of sign language information, gesture information and facial expression information.

In a second aspect, according to one or more embodiments of the present disclosure, a text display apparatus includes:
a communication module configured to acquire a real scene image and a to-be-displayed text;
a processing module configured to invoke motion track data for texts to perform dynamic special effect processing on the to-be-displayed text;
a display module configured to display on the real scene image the text which has been subject to the dynamic special effect processing.

In an optional implementation, the communication module is configured to receive an instruction for selecting a dynamic special effect type from a user.

The processing module is also configured to determine a special effect display area in the real scene image according to the selected dynamic special effect type.

The display module is configured to display on the special effect display area of the real scene image the text which has been subject to the dynamic special effect processing.

In an optional implementation, the processing module is also configured to perform target recognition processing on the real scene image according to the selected dynamic special effect type, determine in the real scene image an image area where the to-be-recognized target is located; and determine the special effect display area according to the image area where the to-be-recognized target is located.

In an optional implementation, the communication module is configured to receive an instruction for selecting a dynamic special effect type from the user.

The processing module is specifically configured to invoke a corresponding type of motion track data for texts from a text motion track database according to the selected dynamic special effect type; generate a three-dimensional text modeling of the to-be-displayed text according to the selected dynamic special effect type, to obtain modeling data of the text; and process the modeling data of the text using the motion track data for texts to obtain the text which has been subject to the dynamic special effect processing.

In an optional implementation, the modeling data of the text includes three-dimensional text coordinates of the text.

The motion track data for texts includes coordinates of text positions in different motion frames.

The processing module is specifically configured to map the three-dimensional text coordinates of the text to a coordinate system on which the motion track data for texts is based using a preset coordinate mapping script; and perform coordinate aligning processing on the mapped three-dimensional text coordinates of the text with the coordinates of the text position in each motion frame in the motion track data for texts; and take the text which has been subject to the coordinate aligning processing as the text which has been subject to the dynamic special effect processing.

In an optional implementation, the processing module is also configured to perform special effect processing on a text shape of the text.

In an optional implementation, the display module is specifically configured to, based on augmented reality display technology, perform a fuse processing on the text which has been subject to the dynamic special effect processing with the real scene image, and display the real scene image which has been subject to the fusion processing.

In an optional implementation, the communication module is also configured to acquire a voice input by the user, perform voice conversion on the voice, to obtain the to-be-displayed text.

In an optional implementation, the communication module is also configured to acquire body information input by the user, according to a mapping relationship between preset body information and texts, determine a text corresponding to the body information, and take the text corresponding to the body information as the to-be-displayed text.

In an optional implementation, the body information includes one or more of sign language information, gesture information and facial expression information.

In a third aspect, according to one or more embodiments of the present disclosure, an electronic device includes: at least one processor and a memory;

the memory stores computer execution instructions;

the at least one processor executes the computer execution instructions stored in the memory, to cause the at least one processor to execute the text display method as described in any one of the above implementations.

In a fourth aspect, according to one or more embodiments of the present disclosure, a computer-readable storage medium is provided in which computer execution instructions are stored. When the processor executes the computer execution instructions, the text display method described in any one of the above implementations is implemented.

The above description only illustrates preferred embodiments of the present disclosure and applied technical principles. Those skilled in the art should understand that the disclosure scope involved in this disclosure is not limited to the technical solutions obtained by the specific combination of the above technical features, but also covers other technical solutions obtained by arbitrary combination of the above technical features or their equivalent features without departing from the above disclosure concept. For example, the above features and the technical features provided in the present disclosure (but not limited to) with similar functions can be replaced each other to form a technical solution.

Furthermore, although the operations have been described in a particular order, this should not be understood as requiring the operations to be performed in the particular order shown or in a sequential order. Under certain circumstances, multitasking and parallel processing can be beneficial. Similarly, although the above discussion contains a number of specific implementation details, these should not be interpreted as limiting the scope of the disclosure. Certain features described in the context of separate embodiments can also be implemented in a single embodiment in combination. On the other hand, various features described in the context of a single embodiment can also be implemented in multiple embodiments individually or in any suitable sub combination.

Although the subject matter has been described in terms specific to the structural features and/or method logic actions, it should be understood that the subject matter defined in the appended claims is not necessarily limited to the specific features or actions described above. On the contrary, the specific features and actions described above are only examples of implementing the claims.

What is claimed is:

1. A text display method, comprising:
acquiring a real scene image;
acquiring a to-be-displayed text;
invoking motion track data for texts to perform dynamic special effect processing on the to-be-displayed text;
displaying, on the real scene image, the text which has been subject to the dynamic special effect processing,
wherein invoking the motion track data for the texts to perform the dynamic special effect processing on the to-be-displayed text, comprises:
receiving an instruction for selecting a dynamic special effect type from a user;
invoking a corresponding type of motion track data for texts from a text motion track database according to the selected dynamic special effect type;
generating a three-dimensional text modeling of the to-be-displayed text according to the selected dynamic special effect type, and obtaining modeling data of the text;
processing the modeling data of the text with the motion track data for texts to obtain the text which has been subject to the dynamic special effect processing,
wherein the modeling data of the text comprises three-dimensional text coordinates of the text, and the motion track data for texts comprises coordinates of text positions in different motion frames; and
wherein processing the modeling data of the text with the motion track data for texts to obtain the text which has been subject to the dynamic special effect processing comprises:
mapping the three-dimensional text coordinates of the text to a coordinate system, on which the motion track data for texts is based, by using a preset coordinate mapping script;
performing coordinate aligning processing on the mapped three-dimensional text coordinates of the text with the coordinates of the text position in each motion frame in the motion track data for texts; and
taking the text which has been subject to the coordinate aligning processing as the text which has been subject to the dynamic special effect processing.

2. The text display method according to claim 1, wherein displaying, on the real scene image, the text which has been subject to the dynamic special effect processing comprises:
receiving an instruction for selecting a dynamic special effect type from a user;
determining a special effect display area in the real scene image according to the selected dynamic special effect type;
displaying, on the special effect display area of the real scene image, the text which has been subject to the dynamic special effect processing.

3. The text display method according to claim 2, wherein determining the special effect display area in the real scene image according to the selected dynamic special effect type, comprises:
performing target recognition processing on the real scene image according to the selected dynamic special effect type, to determine, in the real scene image, an image area where a to-be- recognized target is located;
determining the special effect display area according to the image area where the to-be- recognized target is located.

4. The text display method according to claim 3, further comprises:
acquiring a voice input by the user, performing voice conversion on the voice, to obtain the to-be-displayed text.

5. The text display method according to claim 3, further comprises:
acquiring body information input by the user, according to a mapping relationship between preset body information and texts, determining a text corresponding to the body information, and taking the text corresponding to the body information as the to-be-displayed text.

6. The text display method according to claim 2, wherein the dynamic special effect processing further comprises:
performing special effect processing on a text shape of the text.

7. The text display method according to claim 2, further comprises:
acquiring a voice input by the user, performing voice conversion on the voice, to obtain the to-be-displayed text.

8. The text display method according to claim 2, further comprises:
acquiring body information input by the user, according to a mapping relationship between preset body information and texts, determining a text corresponding to the body information, and taking the text corresponding to the body information as the to-be-displayed text.

9. The text display method according to claim 1, wherein the dynamic special effect processing further comprises:
performing special effect processing on a text shape of the text.

10. The text display method according to claim 1, wherein displaying, on the real scene image, the text which has been subject to the dynamic special effect processing comprises:
based on augmented reality display technology, performing a fuse processing on the text, which has been subject to the dynamic special effect processing, with the real scene image, and displaying the real scene image which has been subject to the fusion processing.

11. The text display method according to claim 1, further comprises:
acquiring a voice input by the user, performing voice conversion on the voice, to obtain the to-be-displayed text.

12. The text display method according to claim 1, further comprises:
acquiring body information input by the user, according to a mapping relationship between preset body information and texts, determining a text corresponding to the body information, and taking the text corresponding to the body information as the to-be-displayed text.

13. The text display method according to claim 12, wherein the body information comprises one or more of sign language information, gesture information and facial expression information.

14. An electronic device comprising:
at least one processor; and
a memory,
wherein the memory stores computer execution instructions;
the at least one processor executes the computer execution instructions stored in the memory, to cause the at least one processor executes the text display method according to claim 1.

15. A computer readable storage medium, wherein computer execution instruction is stored in the computer readable storage medium, and in a case where the processor executes the computer execution instructions, the text display method according to claim 1 is implemented.

16. A text display apparatus comprises:
a communication module, configured to acquire a real scene image and a to-be-displayed text;
a processing module, configured to invoke motion track data for texts to perform dynamic special effect processing on the to-be-displayed text; and
a display module, configured to display, on the real scene image, the text which has been subject to the dynamic special effect processing,
wherein the communication module is configured to receive an instruction for selecting a dynamic special effect type from a user,
wherein the processing module is configured to: invoke a corresponding type of motion track data for texts from a text motion track database according to the selected dynamic special effect type, generate a three-dimensional text modeling of the to-be-displayed text according to the selected dynamic special effect type, and obtain modeling data of the text, and process the modeling data of the text with the motion track data for texts to obtain the text which has been subject to the dynamic special effect processing,
wherein the modeling data of the text comprises three-dimensional text coordinates of the text, the motion track data for texts comprises coordinates of text positions in different motion frames, and
wherein the processing module is further configured to process the modeling data of the text with the motion track data for texts to obtain the text which has been subject to the dynamic special effect processing comprising:
mapping the three-dimensional text coordinates of the text to a coordinate system, on which the motion track data for texts is based, by using a preset coordinate mapping script;
performing coordinate aligning processing on the mapped three-dimensional text coordinates of the text with the coordinates of the text position in each motion frame in the motion track data for texts; and
taking the text which has been subject to the coordinate aligning processing as the text which has been subject to the dynamic special effect processing.

* * * * *